July 25, 1961 A. L. SCHAIBLE, JR 2,993,524
MACHINE FOR SALVAGING METAL IN PRINTING PLATES
Filed March 26, 1958 3 Sheets-Sheet 1
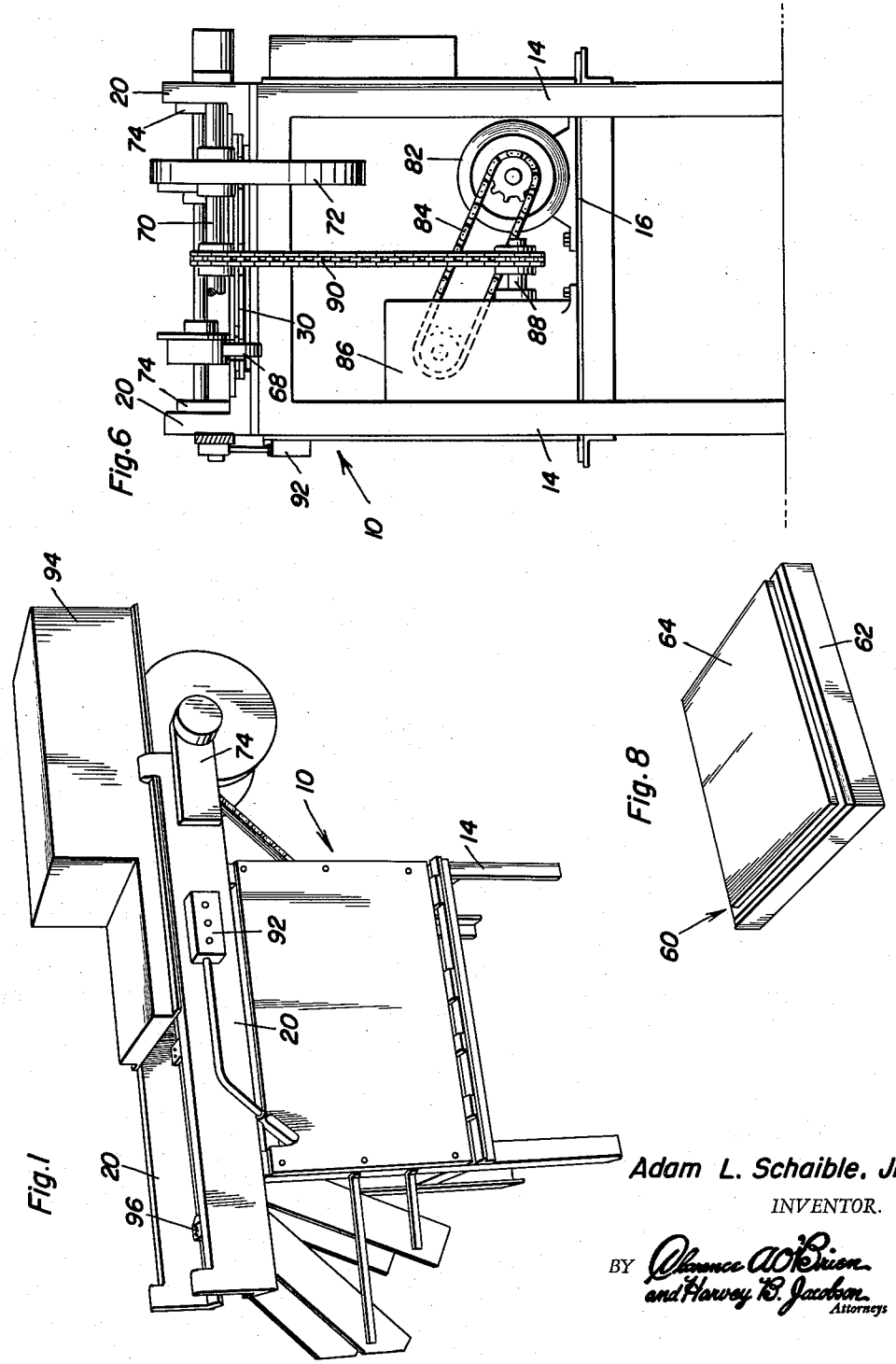
Adam L. Schaible, Jr.
INVENTOR.
BY Clarence A. O'Brien
and Harvey B. Jacobson
Attorneys

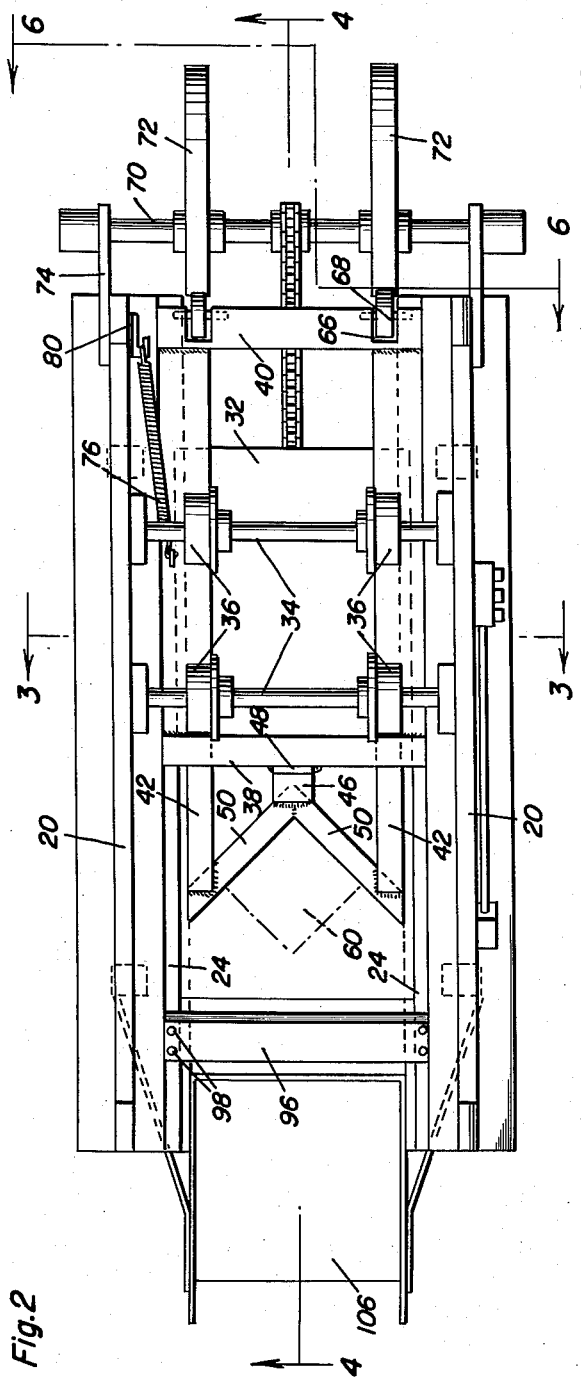
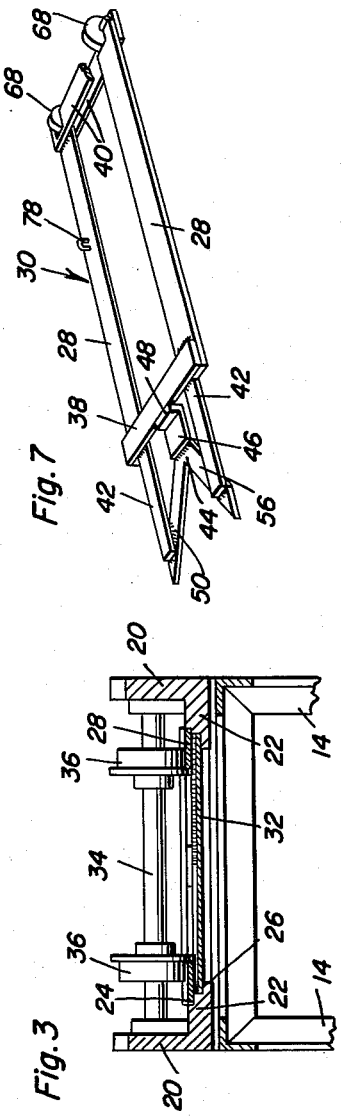

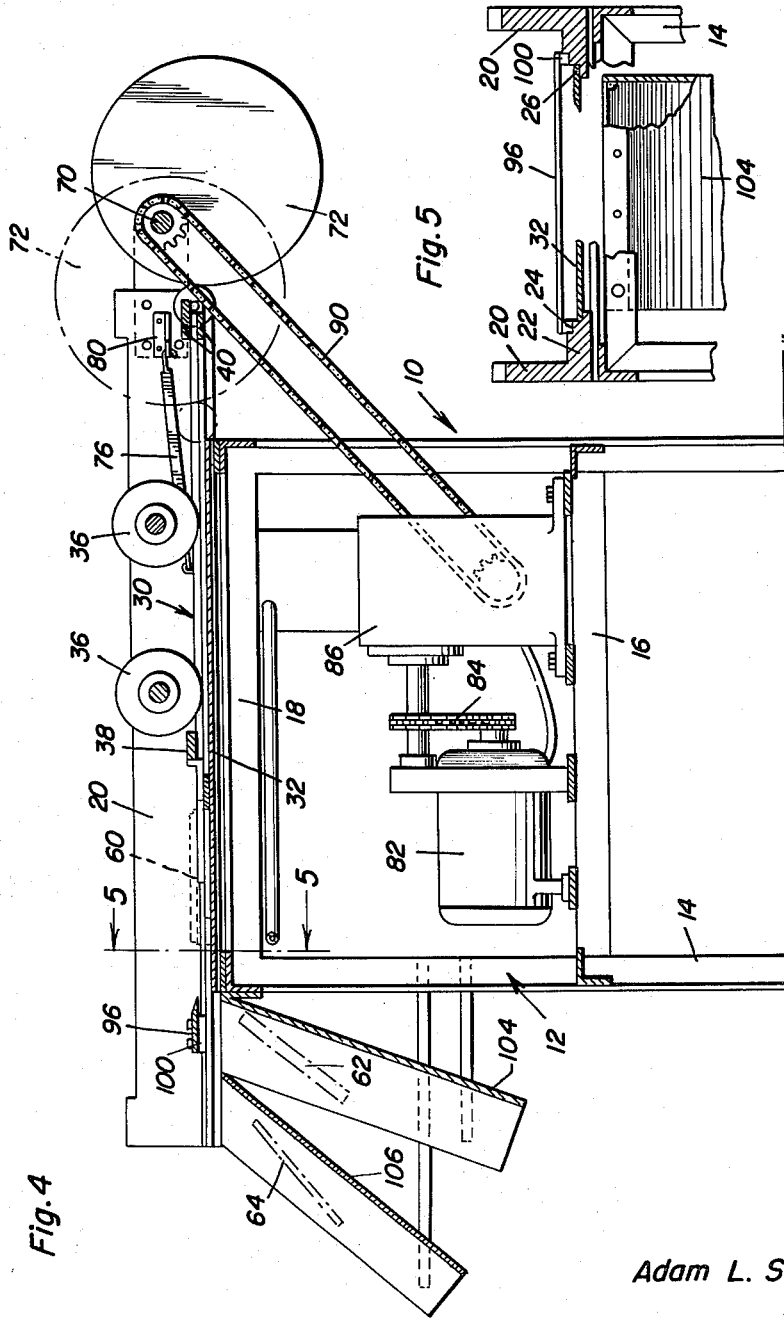

United States Patent Office 2,993,524
Patented July 25, 1961

2,993,524
MACHINE FOR SALVAGING METAL IN PRINTING PLATES
Adam L. Schaible, Jr., Mounted Rte. 40, Easton, Pa.
Filed Mar. 26, 1958, Ser. No. 724,065
4 Claims. (Cl. 154—1)

This invention comprises a novel and useful machine for salvaging metal in printing plates and more particularly relates to an apparatus for stripping metal plates or sheets from blocks or bases upon which they are mounted whereby the metallic content may be salvaged and reclaimed for further use.

The primary object of this invention is to provide an apparatus for quickly, economically and effectively stripping metal plates or sheets from the flat surfaces of blocks or bases to which they are attached whereby the metal plates may be reclaimed and salvaged.

A further object of the invention is to provide an apparatus in accordance with the foregoing object whereby a carriage may securely retain in position a block thereon having a metal sheet or plate affixed thereto which is to be stripped therefrom and convey this block against an adjustable stationary knife whereby to sever and remove the sheet or plate from its base.

Yet another object of the invention is to provide an apparatus in accordance with the preceding object wherein the carriage shall have an automatic rectilinear reciprocatory motion imparted thereto.

A still further object of the invention is to provide an apparatus in accordance with the preceding objects which shall be compact in nature, and which shall automatically separate and remove the disassociated metal sheet or plate and the base upon which the same was mounted after the stripping operation has been completed.

These together with other objects and advantages which will become subsequently apparent reside in the details of construction and operation as more hereinafter described and claimed, reference being had to the accompanying drawings forming a part hereof, wherein like numerals refer to like parts throughout, and in which:

FIGURE 1 is a perspective view of an apparatus in accordance with this invention;

FIGURE 2 is a top plan view of the apparatus of FIGURE 1 showing the position of an article to have a metal plate stripped therefrom in dotted lines upon the carriage of the device;

FIGURE 3 is a vertical transverse sectional view, parts being broken away and omitted, taken substantially upon the plane indicated by the section line 3—3 of FIGURE 2 and showing in particular the manner in which the carriage is supported for reciprocatory movement upon tracks carried by the supporting frame of the device;

FIGURE 4 is a vertical longitudinal sectional view taken substantially upon the plane indicated by the section line 4—4 of FIGURE 2, the position of the block from which a metal plate is to be stripped being shown in dotted lines therein;

FIGURE 5 is a detail view taken in vertical transverse section substantially upon the plane indicated by the section line 5—5 of FIGURE 4 and showing the relative position of the stationary knife with respect to the carriage supporting tracks of the device;

FIGURE 6 is a view partly in end elevation and partly in vertical section, taken substantially upon the plane indicated by the broken section line 6—6 of FIGURE 2 and showing in particular the position of the operating means for imparting reciprocation to the carriage of the device;

FIGURE 7 is a perspective view of the carriage; and

FIGURE 8 is a perspective view of one form of a printing plate and its mounting base from which the plate may be severed by this device.

In the accompanying drawings, the numeral 10 designates generally a suitable form of apparatus incorporating therein the principles of this invention. The apparatus consists of a cabinet-like or bench-like construction having a suitable supporting frame such as that indicated at 12, the same including vertically extending members 14 comprising legs, a horizontal shelf member 16 and horizontal members 18 comprising a top. Mounted upon the top of the supporting frame and extending horizontally beyond the opposite ends of the same is a pair of side walls 20 which preferably are L-shaped in cross-section, extending beyond or overhanging opposite sides of the cabinet and include horizontal inwardly extending opposed flanges 22. As best shown in FIGURE 3, the flanges are provided with upper and lower longitudinally extending recesses 24 and 26. The side members 28 of a carriage 30, see FIGURE 7, are slidably received in the recesses 24 which comprise tracks for the same, while a partition 32 is seated in the lower recess 26. Suitably journaled in the side walls 20 is a pair of shafts 34 each of which is provided with a pair of guide rollers 36 thereon which overlie the side members 28 of the carriage 30 to hold the same downwardly upon the track 24. Thus the carriage is secured to the track for rectilinear reciprocation therealong in any manner, by any means for a purpose to be subsequently apparent.

The carriage has an open frame work construction as will be apparent from FIGURE 7 in conjunction with FIGURE 2, including the previously mentioned side members 28, a forward cross member 38 and rearward cross members 40 to provide a rectangular construction. At their forward end the side members 28 have laterally reduced forwardly projecting extensions 42 and a V-shaped plate 44 is secured to the underside of these extensions and projects slightly forwardly therefrom, the plate having a flat rear portion 46 and upwardly projecting flange 48. The two arms 50 of the plate 4 are preferably secured as by welding to the underside of the extensions 42, while the flange 48 is likewise secured by welding to the front cross member 38 to thereby rigidly connect the plate 44 to the carriage 30.

As will be now understood the article 60 which is to be handled by this apparatus may be received in the V-shaped notch at the front end of the plate 44 as indicated in dotted lines in FIGURES 2 and 4 so that this article, resting upon the bottom wall or partition plate 32 may be moved forwardly upon rectilinear reciprocation of the carriage forwardly.

An example of the type of article 60 for which this invention is designed may consist of a base 62 of any suitable shape of wood or the like, to which is fixedly secured as by an adhesive or the like a metallic plate or sheet of metal 64. The purpose of this invention is to strip the sheet or plate 64 from the base 62 whereby the metallic plate may be reclaimed and salvaged for further use.

At its rearward end the carriage cross members 40 are preferably notched or recessed as at 66 and cam follower rollers 68 are journaled in and project rearwardly from this recess.

A cam shaft 70, having a pair of suitably contoured operating cams 72 is journaled in the support bracket 74 projecting from one end of the support frame, these cams cooperating with the cam followers 68 to impart rectilinear reciprocation in one direction to the carriage 30. Return of the carriage is effected by an expansion spring 76 which may be secured to an anchor 78 on the carriage upon one of the side members 28 thereof, and to a suitable anchoring means 80 on the supporting frame. In order to impart rotation to the shaft 70 and thus effect rectilinear reciprocation of the carriage 30, a source of power such as an electric motor 82 is mounted upon the horizontal shelf or platform 16 and is connected as by a chain drive 84 through a reduction gear assembly 86 of any conventional design. A power take-off shaft 88 from the latter in turn is connected as by a chain drive 90 to the cam shaft 70 for operation of the latter. Suitable control switches 92 may be secured to one of the side members 20 in order to control the supply of power to the motor 82 and thus control the operation of the device.

A removable closure or cover 94 may be provided for enclosing that portion of the top of the device which includes the cam shaft, the cams and the cam followers and the spring return means of the carriage.

Referring now especially to FIGURES 2 and 5 it will be seen that a rigid stationary knife blade 96 is secured as by fasteners 98 in the recess 24 in adjustably spaced relation thereto as by the spacer members 100 shown in FIGURE 5. This knife blade is so positioned that when the block 60 shown in dotted lines in FIGURE 2 is driven forwardly towards the forward reciprocation of the carriage 30, the knife blade will engage, as will be apparent from FIGURE 4, the block at the place of attachment of the plate 64 thereon to the base 62, thereby severing and separating the plate from the base. The extremity of the partition or plate 32 terminates in the region of the knife blade 96 as shown in FIGURE 4, in order that the base 62, shown in dotted lines in FIGURE 4, may be dropped downwardly off of the plate 32 into a base collecting trough or chute 104, while the separated plate 64 will pass over the knife and drop into a further disposed receiving means or chute 106. From the two chutes, the separated bases and plates may be collected for suitable disposition.

It will be apparent that the knife may be so adjusted with respect to the surface of the plate 32 along which the articles 60 are slid by the carriage as to effectively strip metallic sheets or plates from different types of articles.

The carriage serves merely to position the article and to then advance the same against the stationary knife to effect the stripping operation. During the operation of the carriage, the holddown rollers 36 effectively retain the carriage upon the tracks constituted by the recesses 24 while the spring means 76 returns the carriage to its initial position when its stroke is completed.

The device thus provides a means for rapidly and effectively stripping plates from objects to which they are secured for reclaiming the metal and materials therein.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention as claimed.

Whta is claimed as new is as follows:

1. A machine for stripping metal printing plates from bases, said machine comprising a support frame including a pair of parallel longitudinally extending side walls, said side walls each being generally L-shaped in cross-section and including an upstanding flange and a horizontal flange, said horizontal flanges being directed inwardly and toward each other, confronting longitudinally extending and upwardly opening recesses formed in the upper surfaces of the adjacent free ends of said horizontal flanges, a carriage, said carriage including a pair of parallel side members having substantially flat upper and lower surfaces slidingly seated in said recesses for reciprocating movement longitudinally of said frame, a pair of shafts, means carried by said side walls journaling the opposite ends of said shafts for rotation about longitudinally spaced and transversely extending axes, a pair of flanged guide rollers carried by the opposite ends of each of said shafts and disposed in rolling frictional engagement with the upper surfaces of said side members of said carriage, the flanges of said rollers slidably engaging the confronting free end edges of said horizontal flanges, a knife, means supporting said knife on said frame between said side walls, and means on said carriage for holding and positioning the base with a preceding plate fixed thereto whereby upon horizontal movement of said carriage the knife will sever and separate the plate from said base.

2. The combination of claim 1 including means for receiving the plates separated from the bases and separate means for receiving the bases.

3. The combination of claim 1 wherein said operating means includes a cam shaft journaled on said frame, cam followers on said carriage engaging said cam shaft.

4. A machine for stripping metal printing plates from bases comprising a support frame, a carriage, means mounting said carriage on said frame for horizontal travel, a knife, means supporting said knife on said frame above said carriage, means on said carriage for holding and positioning a base with a preceding plate fixed thereto whereby upon horizontal movement of said carriage the knife will sever and separate the plate from said base, said holding and positioning means comprising a V-shaped plate secured to said carriage adjacent said knife, the sides of said V-shaped plate opening toward said knife whereby a rectangular article may have one of its corners positioned in the apex of said plate with the opposite corner first presented to said blade upon movement of said carriage toward said knife.

References Cited in the file of this patent

UNITED STATES PATENTS

| 18,506 | Hardy et al. | Oct. 27, 1857 |
| 513,334 | Mettler | Jan. 23, 1894 |
| 1,525,075 | Hill | Feb. 3, 1925 |
| 1,866,941 | Peters | July 12, 1932 |

FOREIGN PATENTS

| 565,364 | Great Britain | Nov. 7, 1944 |